US008677266B2

(12) United States Patent
Xie

(10) Patent No.: US 8,677,266 B2
(45) Date of Patent: Mar. 18, 2014

(54) METHOD FOR MOVING A CHINESE INPUT CANDIDATE WORD BOX AND MOBILE TERMINAL

(75) Inventor: Zhihua Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,206

(22) PCT Filed: May 19, 2010

(86) PCT No.: PCT/CN2010/072928
§ 371 (c)(1),
(2), (4) Date: Jun. 13, 2012

(87) PCT Pub. No.: WO2010/148838
PCT Pub. Date: Dec. 29, 2010

(65) Prior Publication Data
US 2012/0246595 A1 Sep. 27, 2012

(30) Foreign Application Priority Data
Dec. 15, 2009 (CN) .......................... 2009 1 0259269

(51) Int. Cl.
*G06F 3/048* (2013.01)
(52) U.S. Cl.
USPC ............ 715/799; 715/858; 715/764; 715/788
(58) Field of Classification Search
None
See application file for complete search history.

(56) References Cited

U.S. PATENT DOCUMENTS 4,803,474 A * 2/1989 Kulp .............................. 345/160
5,187,480 A * 2/1993 Thomas et al. ................. 341/22
(Continued)

FOREIGN PATENT DOCUMENTS

| CN | 1193140 A | 9/1998 |
| CN | 101236476 A | 8/2008 |

(Continued)

OTHER PUBLICATIONS

International Search Report in international application No. PCT/CN2010/072928, mailed on Oct. 8, 2010.

(Continued)

*Primary Examiner* — Phenuel Salomon
*Assistant Examiner* — Mahelet Shiberou
(74) *Attorney, Agent, or Firm* — Oppedahl Patent Law Firm LLC

(57) ABSTRACT

The disclosure provides a method for moving a Chinese input candidate word box and a mobile terminal, wherein the method includes: creating a candidate word box and drawing the candidate word box in a position within the range of a screen; analyzing and calculating a moving distance after generating an input signal, through directly dragging the candidate word box by a user or through operating a direction key or a direction soft key by the user to move the candidate word box; and destroying the candidate word box in situ when the moving distance is not beyond the range of the screen, and redrawing a candidate word box in a new position which the candidate word box is moved to. The method and the mobile terminal of the disclosure enable the user to freely move the position of the candidate word box within the range of the screen according to the user's requirement when the user inputs Chinese, so that the user can acquire the view in the range of the whole screen, thereby improving utilization rate of the range of the screen.

17 Claims, 2 Drawing Sheets

(56) References Cited

U.S. PATENT DOCUMENTS

| | | | |
|---|---|---|---|
| 5,615,384 | A | 3/1997 | Allard |
| 5,835,100 | A * | 11/1998 | Matsufusa .................... 345/467 |
| 6,256,072 | B1 * | 7/2001 | Bae et al. ...................... 348/568 |
| 6,288,705 | B1 * | 9/2001 | Rosenberg et al. ........... 345/163 |
| 6,765,598 | B2 * | 7/2004 | Kim .............................. 715/857 |
| 6,809,725 | B1 | 10/2004 | Zhang |
| 6,966,031 | B1 | 11/2005 | Shum |
| 7,088,861 | B2 * | 8/2006 | van Meurs .................... 382/185 |
| 7,444,599 | B1 * | 10/2008 | Chaudhri et al. ............. 715/830 |
| 7,574,678 | B2 * | 8/2009 | Maehiro et al. ............... 715/856 |
| 8,289,283 | B2 * | 10/2012 | Kida et al. .................... 345/173 |
| 8,299,943 | B2 * | 10/2012 | Longe ............................. 341/22 |
| 2007/0136686 | A1 * | 6/2007 | Price et al. .................... 715/808 |
| 2007/0162868 | A1 * | 7/2007 | Vignet ........................... 715/781 |
| 2007/0188666 | A1 * | 8/2007 | Oh et al. ........................ 348/808 |
| 2007/0216658 | A1 | 9/2007 | Rainisto |
| 2008/0048986 | A1 * | 2/2008 | Khoo ............................. 345/168 |
| 2008/0282179 | A1 * | 11/2008 | Kim et al. ..................... 715/769 |
| 2008/0304890 | A1 * | 12/2008 | Shin et al. ....................... 400/61 |
| 2009/0006956 | A1 * | 1/2009 | Bae et al. ...................... 715/708 |
| 2009/0055768 | A1 * | 2/2009 | Chaudhri et al. ............. 715/784 |
| 2009/0158191 | A1 * | 6/2009 | Varanda ........................ 715/773 |
| 2009/0225041 | A1 * | 9/2009 | Kida et al. .................... 345/173 |
| 2010/0083167 | A1 * | 4/2010 | Kikuchi et al. ............... 715/786 |
| 2010/0281416 | A1 * | 11/2010 | Fuyuno ......................... 715/773 |
| 2012/0079414 | A1 * | 3/2012 | Eischeid et al. .............. 715/781 |

FOREIGN PATENT DOCUMENTS

| | | |
|---|---|---|
| CN | 101763217 A | 6/2012 |
| EP | 0651543 A2 | 5/1995 |
| JP | 2008077182 A | 4/2008 |

OTHER PUBLICATIONS

English Translation of the Written Opinion of the International Search Authority in international application No. PCT/CN2010/072928, mailed on Oct. 8, 2010.

Supplementary European Search Report in European counterpart application No. 10791344.4, mailed on Dec. 9, 2013.

* cited by examiner

METHOD FOR MOVING A CHINESE INPUT CANDIDATE WORD BOX AND MOBILE TERMINAL

TECHNICAL FIELD

The disclosure relates to the technical field of mobile terminal input method, and in particular to a method for freely moving a Chinese input candidate word box within the range of a screen, and a mobile terminal using the method.

BACKGROUND

At present, almost all mobile terminals are provided with input modules. However, there is a slight difference between input of Chinese and input of other languages, that is, a candidate word box is required during the Chinese input to facilitate a user to select the words as required. One common limitation of the mobile terminals is that the available range of the screen is limited for the user, therefore it has become a research subject with great application value on how to obtain a larger screen utilization rate and increase the viewing area within the limited range of the screen when the user inputs Chinese.

The existing input methods have realized that the position of the candidate word box can be regulated automatically according to the position of the character inputted by a user to ensure that the user can see the characters in the current input line. However, during the user's input, the position of the candidate word box is stationary, thus leading to an inherent shortcoming, that is, the area covered by the candidate word box is invisible to the user, which causes trouble for the user, especially, when there are characters in the covered area that the user would like to see.

SUMMARY

The disclosure provides a method for moving a Chinese input candidate word box and a mobile terminal, which can control the position of a Chinese input candidate word box in a mobile terminal according to the input requirements of the user to further expand the range of the view when the user inputs Chinese.

In order to solve the aforementioned technical problem, the disclosure provides a method for moving a Chinese input candidate word box. The method includes: creating a candidate word box and drawing the candidate word box in a position within a range of a screen; analyzing and calculating a moving distance after generating an input signal through directly dragging the candidate word box by a user or through operating a direction key or a direction soft key by the user to move the candidate word box; and destroying the candidate word box in situ when the moving distance is not beyond the range of the screen, and redrawing a candidate word box in a new position which the candidate word box is moved to.

Further, when the moving distance is beyond the range of the screen, the method may further include: recording a distance between an initial position of the candidate word box and an edge of the screen in the direction as the moving distance.

Further, when the candidate word box is initially created, the method may further include: creating the candidate word box in an area of a previous line of a current edited text or in an area of a next line of the current edited text.

Further, the step of calculating the moving distance may include: recording the pressed direction keys and a number of times of pressing the direction keys when input signals are generated through operating the direction keys or the direction soft keys to move the candidate word box, and calculating the moving distance according to the number of times of pressing the direction keys; and recording initial position information when effective input signals are generated by direct dragging of the user, and calculating the moving distances in the horizontal and vertical directions according to the initial position information.

Further, when the input signals are generated through operating keys other than the direction keys of a mobile terminal, the method may further include: shielding the input signals or exiting a current operating status.

Further, when the input signals are generated through operating the direction keys or direction soft keys to move the candidate word box, the method may further include: correspondingly moving a set step length each time when operating the direction key or the direction soft key once.

Further, the set step length in a horizontal direction may be a width of a Chinese character, and the set step length in a vertical direction may be a height of a Chinese character.

Further, when the input signals are generated by direct dragging of the user, the method may further include: calculating the moving distances of the candidate word box in the horizontal and vertical directions according to a difference between a horizontal coordinate value of the initial position before dragging and a horizontal coordinate value of the initial position after dragging and a difference between a vertical coordinate value of the initial position before dragging and a vertical coordinate value of the initial position after dragging, and respectively multiplying a horizontal moving distance and a vertical moving distance by a conversion coefficient to obtain the moving distances of the candidate word box.

In order to solve the aforementioned technical problem, the disclosure further provides a mobile terminal, wherein the mobile terminal is a mobile terminal with a moveable Chinese input candidate word box; and the mobile terminal includes: a candidate word box creating and initializing module, an input sensing module, a position managing and analyzing module, a candidate word box destroying module and a candidate word box drawing module; wherein the candidate word box creating and initializing module is configured to create a candidate word box;

the candidate word box drawing module is configured to draw the candidate word box, and redraw a candidate word box after the candidate word box is destroyed in situ and moved to a new position;

the input sensing module is configured to receive an input signal generated through directly dragging the candidate word box by a user or through operating a direction key or a direction soft key by the user to move the candidate word box; and start the position managing and analyzing module and the candidate word box destroying module;

the position managing and analyzing module is configured to analyze and calculate a moving distance, and notify the candidate word box drawing module when the moving distance is not beyond a range of a screen; and the candidate word box destroying module is configured to destroy the candidate word box in situ.

Further, the candidate word box creating and initializing module may be further configured to, when creating the candidate word box, generate position information and notify the candidate word box drawing module;

the candidate word box drawing module may be further configured to draw the candidate word box in a target position according to the position information;

the position managing and analyzing module may be further configured to obtain the position information when analyzing and calculating the moving distance.

Further, the position managing and analyzing module may be further configured to, when the moving distance is beyond the range of the screen, record a distance between an initial position of the candidate word box and an edge of the screen in the direction as the moving distance and generate the position information, and notify the candidate word box drawing module.

Further, the candidate word box creating and initializing module may be further configured to, when the input signals are generated through operating the direction keys or direction soft keys to move the candidate word box, record the pressed direction keys and a number of times of pressing the direction keys and obtain a direction of moving, and calculate the moving distance according to the number of times of pressing the direction keys; and record initial position information of the input signals when effective input signals are generated by direct dragging of the user, and calculate the moving distances in the horizontal and vertical directions according to the initial position information.

Further, the candidate word box creating and initializing module may be further configured to, when creating the initial candidate word box, create the candidate word box in an area of a previous line of a current edited text or in an area of a next line of a current edited text, and preset a step length each time when operating the direction key or direction soft key once.

Further, the set step length may include: the step length in a horizontal direction is a width of a Chinese character, and the step length in a vertical direction is a height of a Chinese character.

Further, the position managing and analyzing module may be further configured to, when the input signals are generated by direct dragging of the user, calculate the moving distances of the candidate word box in the horizontal and vertical directions according to a difference between a horizontal coordinate value of the initial position before dragging and a horizontal coordinate value of the initial position after dragging and a difference between a vertical coordinate value of the initial position before dragging and a vertical coordinate value of the initial position after dragging, and respectively multiply a horizontal moving distance and a vertical moving distance by a conversion coefficient to obtain the moving distances of the candidate word box.

Further, the input sensing module may be further configured to shield the input signals or exiting a current operating status when the input signals are generated through operating keys other than the direction keys of the mobile terminal.

The disclosure has the following technical effects:

the position of the candidate word box can be freely moved in the range of the screen according to a user's requirement when the user inputs Chinese, so that the user can acquire the view in the range of the whole screen, increasing utilization rate of the range of the screen;

in addition, the candidate word box is not limited to mobile terminal with a touch screen, and this technology is applicable to all mobile terminals having direction keys and requirement of inputting Chinese.

DETAILED DESCRIPTION

Embodiments of the disclosure will be explained in details according to the drawings and embodiments hereinafter, so that the process of how to apply technical means to solve the technical problem and achieve the technical effects can be fully understood and implemented.

The core of the disclosure involves the following parts.

A candidate word box is designed. Aside from the conventional input status and word selection status, the candidate word box is further provided with a moving status and can receive signals from the direction keys and dragging signals under the moving status to realize the moving of the candidate word box per se. The specific realizing process is: moving the position of the candidate word box in the range of the screen through pressing direction keys of the terminal, or clicking the direction soft keys on the touch screen of the terminal or directly dragging the candidate word box on the touch screen.

Figure 1:
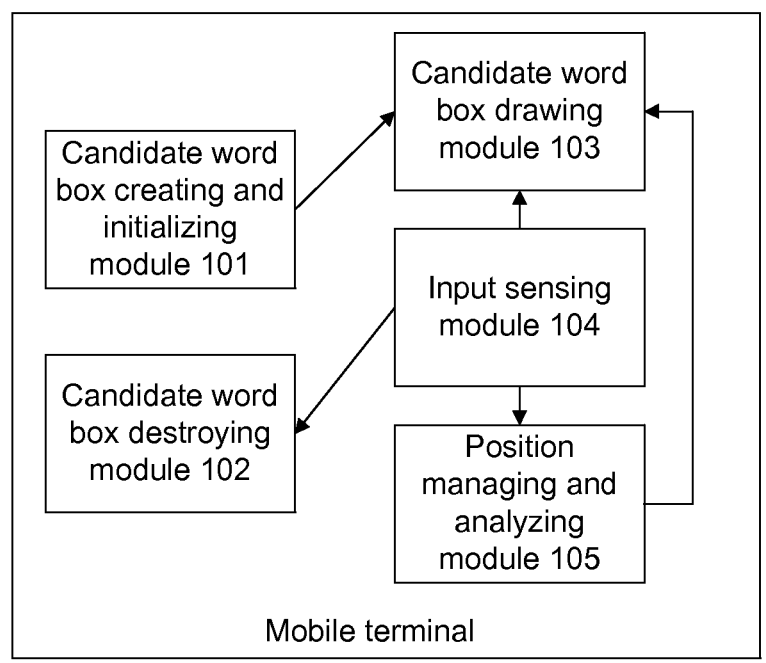
FIG. 1 shows a schematic diagram illustrating module composition structure according to an embodiment of the disclosure.

FIG. 1 shows a schematic diagram illustrating module composition structure according to an embodiment of the disclosure, wherein the specific components of the Chinese input candidate word box and the relations between the components are as follows.

The candidate word box creating and initializing module 101 is configured to create a candidate word box and initialize the relevant attribute variables when a user starts to input Chinese, and call the candidate word box drawing module 103 after the candidate word box is created and initialized by the candidate word box creating and initializing module 101.

The specific implementation comprises distribution of the memory space of the candidate word box, and initialization of such information as the rectangle size of the candidate word box, drawing position, background resources, initial display position of an input area, display interval of an input area, the maximal display width of an input area, initial display position of a candidate area, display interval of a candidate area, the maximal display width of a candidate area, display position of an arrow, resources and directions of an arrow, moving step length of an arrow and the like.

The candidate word box destroying module 102 is configured to release objects such as background resources and the like of the candidate word box, destroy memory space of the candidate word box, and reset related variables or attributes; and destroy the candidate word box in situ when a user selects the needed Chinese character or phrase, or when the input sensing module 104 receives a message indicating that the user presses the direction keys or uses a handwriting pen to click the direction soft keys or uses a handwriting pen to directly drag the candidate word box.

The candidate word box drawing module 103 is configured to draw a candidate word box in a designated position, including drawing the rectangular background of the candidate word box, drawing text of the input area and drawing text of the candidate area.

The input status is entered by default after the candidate word box is drawn; when the input sensing module 104 has received the message indicating that the user pressed a direction key or used a handwriting pen to click a direction soft key or used a handwriting pen to directly drag the candidate word box, and after the candidate word box in situ is destroyed by the candidate word box destroying module 102, the candidate word box drawing module 103 is called to redraw the candidate word box in a new position.

The input sensing module 104 is configured to receive and record signals indicating key pressing and handwriting pen clicking or drawing by the user. The input sensing processing is different in the aforementioned three different candidate box moving methods: under a moving status, for a mobile terminal without a touch screen, the input sensing module can respond to the direction keys, to record the moving direction of the candidate word box according to the direction keys pressed by the user; and for a mobile terminal with a touch screen, the input sensing module can not only respond to the aforementioned operation of key pressing but also can respond to the action of the direction key clicking of the handwriting pen on the soft keyboard or the action of dragging of the handwriting pen within the handwriting sensing area on the candidate word box to record the moving direction of the candidate word box.

Specifically, the input sensing module can add a moving status indicator icon to the end of the character element in the input area and the moving status is entered by operating the icon, for example, the user can select the icon by operating the left and right direction keys in the input area, and press the enter key to enter the moving status of the candidate word box; then, the candidate word box can receive events of key pressing and handwriting pen clicking or dragging by the user, and perform analysis to determine if the condition of moving the candidate word box is satisfied; if so, the input sensing module calls the position managing and analyzing module 105 to calculate the moving distance in the current direction, save the information of the new and original positions, and then calls the candidate word box destroying module 102 to destroy the candidate word box in situ and calls the candidate word box drawing module 103 to redraw a new candidate word box in the new position; In the event of the handwriting pen dragging, when calling the position managing and analyzing module 105 to calculate a displacement, the input sensing module can call the position managing and analyzing module to further perform a certain conversion between the handwriting pen dragging distance and the actual distance that the candidate word box is required to move.

The conditions for the keyboard to control the moving of the candidate word box are as follows: if the current pressed key or the current key clicked by the handwriting pen is the upward direction key, then the moving direction is vertically upward; if the current pressed key or the current key clicked by the handwriting pen is the downward direction key, then the moving direction is vertically downward; if the current pressed key or the current key clicked by the handwriting pen is the left direction key, then the moving direction is towards the left; and if the current pressed key or the current key clicked by the handwriting pen is the right direction key, then the moving direction is towards the right.

In addition, the moving cannot be beyond the range of the screen.

Under the moving status, the user can also return to the input status by pressing keys other than the direction keys.

The position managing and analyzing module 105 is called when the input sensing module 104 receives information of the effective direction key pressing or the information that the candidate word box is dragged, and is configured to record information of the current position of the candidate word box and analyze the displacement of moving the candidate word box according to information of key pressing or handwriting pen clicking or dragging which is transmitted from the input sensing module 104, save the new position, accept the calling of the input sensing module 104, and notify the candidate word box drawing module 103 of the new position.

The position managing and analyzing module comprises an information saving module, a displacement calculating module and a drag displacement converting module; wherein, the information saving module is configured to save the position information of the candidate word box, the position information of the input area, the position information of the candidate area and the like; the displacement calculating module is configured to calculate the actual displacement (a step length is moved in the corresponding direction each time a direction key is pressed or clicked) of the candidate word box according to the information of key pressing or handwriting pen clicking (e.g., clicking times and directions) of the user; and the moving step length applied by the present disclosure is: the width of one Chinese character in the horizontal direction, and the height of one Chinese character in the vertical direction, however the disclosure is not limited to the moving step length mentioned above. The drag displacement converting module, which is an additional module for a mobile terminal with a touch screen, is configured to convert the distance information that the candidate word box is dragged by the handwriting pen, that is, calculate the moving distances of the handwriting pen in the horizontal and vertical directions according to a difference between the value of the horizontal coordinate of the initial position before dragging and the value of the horizontal coordinate of the initial position after dragging and a difference between the value of a vertical coordinate of the initial position before dragging and the value of a vertical coordinate of the initial position after dragging, and respectively multiply the horizontal distance and the vertical distance by a conversion coefficient (the conversion coefficient is ½ in the disclosure, but conversion coefficient of the disclosure is not limited to ½) to obtain the respective moving distances that should be moved by the candidate word box in the horizontal and vertical directions. For a mobile terminal without a touch screen, the drag displacement converting module may not be included in the position managing and analyzing module.

During the practical application, a forceful dragging operation of a user may result in an overlarge moving distance, such that the user may consider intuitively that the moving operation is excessively sensitive and unfavorable to control, thereby influencing the user's experience; therefore, through performing a certain conversion on the actual moving distance of the user by using a conversion coefficient, the dragging operation can be better controlled, the moving speed during the dragging performed by the handwriting pen is intuitively slowed down and the sensitivity is decreased, so that a more friendly operation experience can be provided for the user.

The implementation method of the disclosure is described in brief as follows.

In the Chinese input method, including pinyin, strokes, phonetic notation and the like, when the user presses the numeric keys and starts to input Chinese, the candidate word box is automatically created and drawn at a position in the line which is adjacent to the line of the current edited text; after the moving status is selected, the user can press the direction keys, or click the direction soft keys, or directly drag the candidate word box, the candidate word box receives such input signals and performs analysis and computation on the related moving information.

If the moving distance is not beyond the range of the screen, the candidate word box in situ will be destroyed, and at the same time, the candidate word box will be redrawn in a new position which the candidate word box is moved to, to realize the moving of the candidate word box.

If the moving distance is beyond the range of the screen, the moving distance is recorded as the distance from the initial position of the candidate word box to the edge of the screen in the direction, the candidate word box in situ is destroyed, and the candidate word box is redrawn in a new position which the candidate word box is moved to.

If keys other than the direction keys of a mobile terminal are operated, the input signals are shielded or the current operation status is exited.

Figure 2:
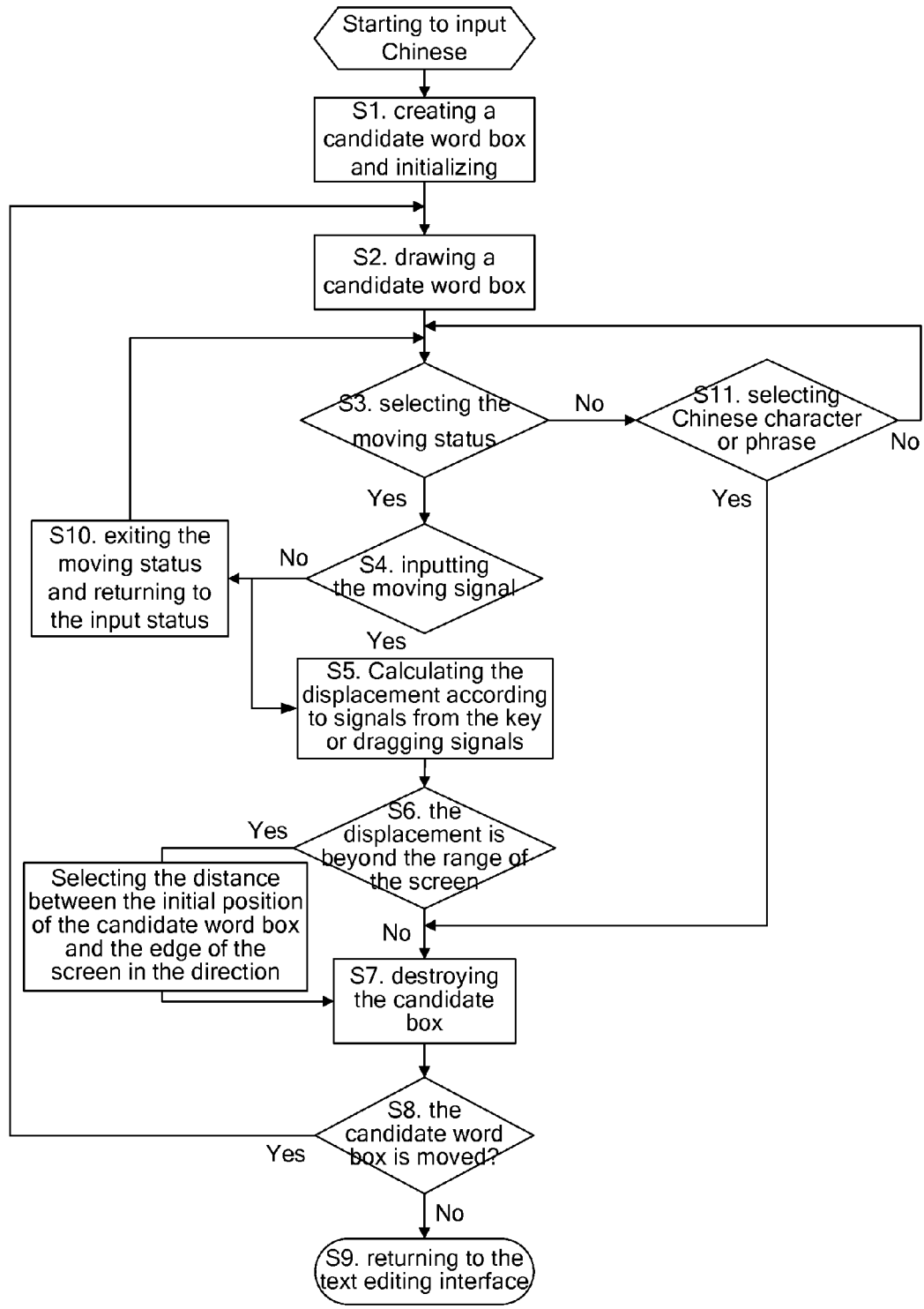
FIG. 2 shows a work flowchart during inputting of Chinese according to an embodiment of the disclosure.

FIG. 2 shows a work flowchart during inputting of Chinese according to an embodiment of the disclosure, and the specific work flow comprises the following steps.

Step S1: a candidate word box is created and initialized by the candidate word box creating and initializing module when a user starts to input Chinese.

Step S2: the candidate word box drawing module is called, and if the current edited line is located at the upper half part of the rectangle area of the text editing box, then the Chinese input candidate word box is drawn at the starting position of the next line of the current text editing line; otherwise, the Chinese input candidate word box is drawn at the position which is a height of a candidate word box upward from the current text editing line.

Step S3: at this moment, the default status of the candidate word box is the input status, and as soon as signals of key pressing, handwriting pen clicking or dragging are generated, the input sensing module is called; and if the user selects the moving status indicator icon by pressing the left and right direction keys, or by using the handwriting pen to click the direction soft keys, and presses the enter key, or directly clicks the moving status indicator icon by using the handwriting pen, the moving status is entered and step S4 is executed; otherwise, step 11 is executed.

Step S4: the user has selected to enter the moving status, and the user again presses the direction keys, or clicks the direction soft keys by using the handwriting pen, or directly drags the candidate word box by using the handwriting pen, the input signal is determined: if the input signal is an effective directional signal, the pressed direction keys and the number of times of pressing are recorded and step S5 is executed; if the input signal is a dragging signal, the initial coordinate position of the dragging signal is recorded and step S5 is executed; and if keys other than the direction keys are pressed, step S10 is executed.

Step S5: the input signal is processed and converted by the position managing and analyzing module 105: the moving distance is calculated according to the number of times of pressing the direction keys; and if the input signal is a dragging signal, the moving distances in the horizontal and vertical directions are calculated according to the initial position information of the dragging and a certain conversion is performed on the actual moving distance according to a given conversion ratio, wherein the calculation of converting the distance is explained in the part of the position managing and analyzing module 105.

Step S6: if the moving distance in the direction represented by the direction key is beyond the range of the screen, the moving distance is considered as the distance from the initial position of the candidate word box to the edge of the screen in the direction represented by the direction key, and step S7 is executed.

If the input signal is a dragging signal, the processing in the case where the moving distance is beyond the range of the screen, is the same as the above processing of the direction keys in the case where the moving distance is beyond the range of the screen, that is, the moving distance is considered as the distance from the initial position of the candidate word box to the edge of the screen in the direction, and step S7 is executed.

If the aforementioned moving conditions are satisfied and the moving distance is not beyond the range of the screen, step S7 is executed according to the moving distance calculated in step S5.

Step S7: if the aforementioned moving conditions are satisfied, the candidate word box destroying module 102 is called to erase the candidate word box in situ and the candidate word box drawing module 103 is called again to redraw the candidate word box in the new initial position.

Step S8: the aforementioned operations can be repeated after steps S1-S7 have been performed, and a check is performed to determine whether the candidate word box needs to be moved; if the candidate word box needs to be moved, step S2 is executed; otherwise, step S9 is executed.

Step S9: return to the text editing interface.

Step S10: if keys other than the direction keys are pressed, the user exits the moving status and returns to the input status.

Step S11: if a character element selection using pinyin, strokes, phonetic notation and the like, is performed normally, switching to the word selection status and word selection operation, step S7 is executed, and the candidate word box destroying module 102 will be called to destroy the candidate word box and enable the user to return to the text editing interface; otherwise, step S3 is executed.

The operation flow of the method corresponds to the function of the aforementioned candidate word box, and the deficiencies in the method can refer to the description of the part of the aforementioned candidate word box, which is not repeated herein.

The following provides further explanation.

The candidate word box will be moved a designated distance vertically upwards each time when the user presses the upward direction key once; if the user presses the upward direction key many times, the candidate word box will be moved vertically upwards according to a constant step length until the upper edge of the candidate word box reaches the upper edge of the range of the screen, and if the user continues to press the upward direction key in this case, the position of the candidate word box will not be changed.

The candidate word box will be moved a designated distance vertically downwards each time when the user presses the downward direction key once; if the user presses the downward direction key many times, the candidate word box will be moved vertically downwards according to a constant step length until the lower edge of the candidate word box reaches the lower edge of the range of the screen; and if the user continues to press the downward direction key in this case, the position of the candidate word box will not be changed.

The candidate word box will be moved a designated distance horizontally towards the left each time when the user presses the left direction key once; if the user presses the left direction key many times, the candidate word box will be moved horizontally towards the left according to a constant step length until the left edge of the candidate word box reaches the left edge of the range of the screen; and if the user continues to press the left direction key in this case, the position of the candidate word box will not be changed.

The candidate word box will be moved a designated distance horizontally towards the right each time when the user presses the right direction key once; if the user presses the right direction key many times, the candidate word box will be moved horizontally towards the right according to a constant step length until the right edge of the candidate word box reaches the right edge of the range of the screen; and if the user continues to press the right direction key in this case, the position of the candidate word box will not be changed.

For a mobile terminal with a touch screen, the candidate word box will be moved a designated distance vertically upwards each time when the user uses the handwriting pen to click the upward direction soft key once; if the user clicks the upward direction soft key many times, the candidate word box will be moved vertically upwards according to a constant step length until the upper edge of the candidate word box reaches the upper edge of the range of the screen; and if the user continues to click the upward direction soft key in this case, the position of the candidate word box will not be changed.

For a mobile terminal with a touch screen, the candidate word box will be moved a designated distance vertically downwards each time when the user uses the handwriting pen to click the downward direction soft key once; if the user clicks the downward direction soft key many times, the candidate word box will be moved vertically downwards according to a constant step length until the lower edge of the candidate word box reaches the lower edge of the range of the screen; and if the user continues to click the downward direction soft key in this case, the position of the candidate word box will not be changed.

For a mobile terminal with a touch screen, the candidate word box will be moved a designated distance horizontally towards the left each time when the user uses the handwriting pen to click the leftward direction soft key once; if the user click the leftward direction soft key many times, the candidate word box will be moved horizontally towards the left according to a constant step length until the left edge of the candidate word box reaches the left edge of the range of the screen; and if the user continues to click the leftward direction soft key in this case, the position of the candidate word box will not be changed.

For a mobile terminal with a touch screen, the candidate word box will be moved a designated distance horizontally towards the right each time when the user uses the handwriting pen to click the rightward direction soft key once; if the user clicks the rightward direction soft key many times, the candidate word box will be moved horizontally towards the right according to a constant step length until the right edge of the candidate word box reaches the right edge of the range of the screen; and if the user continues to click the rightward direction soft key at this moment, the position of the candidate word box will not be changed.

For a mobile terminal with a touch screen, the user uses the handwriting pen to directly drag the candidate word box within a designated effective range, which can realize that the candidate word box is moved along the dragging direction of the handwriting pen until one edge of the candidate word box reaches the corresponding edge of the range of the screen, and if the user continues to drag the candidate word box in this case, the user can only drag the candidate word box along other directions.

Although the embodiments in the disclosure are stated as above, the mentioned contents are not used for limiting the protection scope of the disclosure, and those skilled in the art can make modifications in the forms and details of the implementation without departing from the spirit and scope of the disclosure. The protection scope of the disclosure is still determined by the scope defined by the claims appended.

The invention claimed is:

1. A method for moving a Chinese input candidate word box, comprising:
creating a candidate word box and drawing the candidate word box in a position within a range of a screen;
analyzing and calculating a moving distance after generating an input signal through directly dragging the candidate word box by a user or through operating a direction key or a direction soft key by the user to move the candidate word box; and
destroying the candidate word box in situ when the moving distance is not beyond the range of the screen, and redrawing a candidate word box in a new position which the candidate word box is moved to,
when the moving distance is beyond the range of the screen, recording a distance between an initial position of the candidate word box and an edge of the screen in the direction as the moving distance,
when the input signals are generated by direct dragging of the user, calculating the moving distances of the candidate word box in the horizontal and vertical directions according to a difference between a horizontal coordinate value of the initial position of before dragging and a horizontal coordinate value of the initial position after dragging and a difference between a vertical coordinate value of the initial position before dragging and a vertical coordinate value of the initial position after dragging, and respectively multiplying a horizontal moving distance and a vertical moving distance by a conversion coefficient to slow down a moving speed during the dragging and obtain the moving distances of the candidate word box, further comprising: when the input signals are generated through operating the direction keys or direction soft keys to move the candidate word box, correspondingly moving a set step length each time when operating the direction key or the direction soft key once.

2. The method according to claim 1, wherein the set step length comprises: the step length in a horizontal direction is a width of a Chinese character, and the step length in a vertical direction is a height of a Chinese character.

3. The method according to claim 1, further comprising: when the candidate word box is initially created, creating the candidate word box in an area of a previous line of a current edited text or in an area of a next line of the current edited text.

4. The method according to claim 1, wherein the step of calculating the moving distance comprises:
recording the pressed direction keys and a number of times of pressing the direction keys when input signals are generated through operating the direction keys or the direction soft keys to move the candidate word box, and calculating the moving distance according to the number of times of pressing the direction keys; and
recording initial position information when effective input signals are generated by direct dragging of the user, and calculating the moving distances in the horizontal and vertical directions according to the initial position information.

5. The method according to claim 1, further comprises: when the input signals are generated through operating keys other than the direction keys of a mobile terminal, shielding the input signals or exiting a current operating status.

6. A mobile terminal, comprising: a candidate word box creating and initializing module, an input sensing module, a position managing and analyzing module, a candidate word box destroying module and a candidate word box drawing module; wherein the candidate word box creating and initializing module is configured to create a candidate word box;

the candidate word box drawing module is configured to draw the candidate word box, and redraw a candidate word box after the candidate word box is destroyed in situ and moved to a new position;

the input sensing module is configured to receive an input signal generated through directly dragging the candidate word box by a user or through operating a direction key or a direction soft key by the user to move the candidate word box; and start the position managing and analyzing module and the candidate word box destroying module;

the position managing and analyzing module is configured, when the moving distance is not beyond a range of a screen, to analyze and calculate a moving distance, and notify the candidate word box drawing module, and when the moving distance is beyond the range of the screen, to record a distance between an initial position of the candidate word box and an edge of the screen in the direction as the moving distance and generate the position information, and notify the candidate word box drawing module; and the position managing and analyzing module is further configured to, when the input signals are generated by direct dragging of the user, calculate the moving distances of the candidate word box in the horizontal and vertical directions according to a difference between a horizontal coordinate value of the initial position before dragging and a horizontal coordinate value of the initial position after dragging and a difference between a vertical coordinate value of the initial position before dragging and a vertical coordinate value of the initial position after dragging, and respectively multiply a horizontal moving distance and a vertical moving distance by a conversion coefficient to slow down a moving speed during the dragging and obtain the moving distances of the candidate word box; and the candidate word box destroying module is configured to destroy the candidate word box in situ, wherein the candidate word box creating and initializing module is further configured to, when creating the candidate word box, generate position information and notify the candidate word box drawing module;

the candidate word box drawing module is further configured to draw the candidate word box in a target position according to the position information; and the position managing and analyzing module is further configured to obtain the position information when analyzing and calculating the moving distance, wherein the position managing and analyzing module is further configured to, when the input signals are generated through operating the direction keys or direction soft keys to move the candidate word box, record the pressed direction keys and a number of times of pressing the direction keys, and calculate the moving distance according to the number of times of pressing the direction keys; and record initial position information of the input signals when effective input signals are generated by direct dragging of the user, and calculate the moving distances in the horizontal and vertical directions according to the initial position information.

7. The mobile terminal according to claim 6, wherein the candidate word box creating and initializing module is further configured to, when creating the initial candidate word box, create the candidate word box in an area of a previous line of a current edited text or in an area of a next line of a current edited text, and preset a step length each time when operating the direction key or direction soft key once.

8. The mobile terminal according to claim 6, wherein the input sensing module is further configured to shield the input signals or exiting a current operating status when the input signals are generated through operating keys other than the direction keys of the mobile terminal.

9. The mobile terminal according to claim 6, wherein the position managing and analyzing module is further configured to, when the moving distance is beyond the range of the screen, record a distance between an initial position of the candidate word box and an edge of the screen in the direction as the moving distance and generate the position information, and notify the candidate word box drawing module, wherein the position managing and analyzing module is further configured to, when the input signals are generated by direct dragging of the user, calculate the moving distances of the candidate word box in the horizontal and vertical directions according to a difference between a horizontal coordinate value of the initial position before dragging and a horizontal coordinate value of the initial position after dragging and a difference between a vertical coordinate value of the initial position before dragging and a vertical coordinate value of the initial position after dragging, and respectively multiply a horizontal moving distance and a vertical moving distance by a conversion coefficient to obtain the moving distances of the candidate word box.

10. The mobile terminal according to claim 6, wherein the position managing and analyzing module is further configured to, when the input signals are generated by direct dragging of the user, calculate the moving distances of the candidate word box in the horizontal and vertical directions according to a difference between a horizontal coordinate value of the initial position before dragging and a horizontal coordinate value of the initial position after dragging and a difference between a vertical coordinate value of the initial position before dragging and a vertical coordinate value of the initial position after dragging, and respectively multiply a horizontal moving distance and a vertical moving distance by a conversion coefficient to obtain the moving distances of the candidate word box.

11. A method for moving a Chinese input candidate word box, comprising:

creating a candidate word box and drawing the candidate word box in a position within a range of a screen;

analyzing and calculating a moving distance after generating an input signal through directly dragging the candidate word box by a user or through operating a direction key or a direction soft key by the user to move the candidate word box; and destroying the candidate word box in situ when the moving distance is not beyond the range of the screen, and redrawing a candidate word box in a new position which the candidate word box is moved to, when the moving distance is beyond the range of the screen, recording a distance between an initial position of the candidate word box and an edge of the screen in the direction as the moving distance, when the input signals are generated by direct dragging of the user, calculating the moving distances of the candidate word box in the horizontal and vertical directions according to a difference between a horizontal coordinate value of the initial position of before dragging and a horizontal coordinate value of the initial position after dragging and a difference between a vertical coordinate value of the initial position before dragging and a vertical coordinate value of the initial position after dragging, and respectively multiplying a horizontal moving distance and a vertical moving distance by a conversion coefficient to slow down a moving speed during the dragging and obtain the moving distances of the candidate word box, wherein the step of calculating the moving distance comprises:

recording the pressed direction keys and a number of times of pressing the direction keys when input signals are generated through operating the direction keys or the direction soft keys to move the candidate word box, and calculating the moving distance according to the number of times of pressing the direction keys; and recording initial position information when effective input signals are generated by direct dragging of the user, and calculating the moving distances in the horizontal and vertical directions according to the initial position information, further comprising: when the input signals are generated through operating the direction keys or direction soft keys to move the candidate word box, correspondingly moving a set step length each time when operating the direction key or the direction soft key once.

12. The method according to claim 11, wherein the set step length comprises: the step length in a horizontal direction is a width of a Chinese character, and the step length in a vertical direction is a height of a Chinese character.

13. The method according to claim 11, further comprising: when the candidate word box is initially created, creating the candidate word box in an area of a previous line of a current edited text or in an area of a next line of the current edited text.

14. The method according to claim 11, further comprising: when the input signals are generated through operating keys other than the direction keys of a mobile terminal, shielding the input signals or exiting a current operating status.

15. A mobile terminal, comprising a candidate word box creating and initializing module, an input sensing module, a position managing and analyzing module, a candidate word box destroying module and a candidate word box drawing module; wherein the candidate word box creating and initializing module is configured to create a candidate word box;

the candidate word box drawing module is configured to draw the candidate word box, and redraw a candidate word box after the candidate word box is destroyed in situ and moved to a new position;

the input sensing module is configured to receive an input signal generated through directly dragging the candidate word box by a user or through operating a direction key or a direction soft key by the user to move the candidate word box; and start the position managing and analyzing module and the candidate word box destroying module;

the position managing and analyzing module is configured, when the moving distance is not beyond a range of a screen, to analyze and calculate a moving distance, and notify the candidate word box drawing module, and when the moving distance is beyond the range of the screen, to record a distance between an initial position of the candidate word box and an edge of the screen in the direction as the moving distance and generate the position information, and notify the candidate word box drawing module; and the position managing and analyzing module is further configured to, when the input signals are generated by direct dragging of the user, calculate the moving distances of the candidate word box in the horizontal and vertical directions according to a difference between a horizontal coordinate value of the initial position before dragging and a horizontal coordinate value of the initial position after dragging and a difference between a vertical coordinate value of the initial position before dragging and a vertical coordinate value of the initial position after dragging, and respectively multiply a horizontal moving distance and a vertical moving distance by a conversion coefficient to slow down a moving speed during the dragging and obtain the moving distances of the candidate word box; and the candidate word box destroying module is configured to destroy the candidate word box in situ, wherein the candidate word box creating and initializing module is further configured to, when creating the candidate word box, generate position information and notify the candidate word box drawing module;

the candidate word box drawing module is further configured to draw the candidate word box in a target position according to the position information; and the position managing and analyzing module is further configured to obtain the position information when analyzing and calculating the moving distance, wherein the candidate word box creating and initializing module is further configured to, when creating the initial candidate word box, create the candidate word box in an area of a previous line of a current edited text or in an area of a next line of a current edited text, and preset a step length each time when operating the direction key or direction soft key once, wherein the set step length comprises: the step length in a horizontal direction is a width of a Chinese character, and the step length in a vertical direction is a height of a Chinese character.

16. The mobile terminal according to claim 15 wherein the position managing and analyzing module is further configured to, when the moving distance is beyond the range of the screen, record a distance between an initial position of the candidate word box and an edge of the screen in the direction as the moving distance and generate the position information, and notify the candidate word box drawing module, wherein the position managing and analyzing module is further configured to, when the input signals are generated by direct dragging of the user, calculate the moving distances of the candidate word box in the horizontal and vertical directions according to a difference between a horizontal coordinate value of the initial position before dragging and a horizontal coordinate value of the initial position after dragging and a difference between a vertical coordinate value of the initial position before dragging and a vertical coordinate value of the initial position after dragging, and respectively multiply a horizontal moving distance and a vertical moving distance by a conversion coefficient to obtain the moving distances of the candidate word box.

17. The mobile terminal according to claim 15, wherein the input sensing module is further configured to shield the input signals or exiting a current operating status when the input signals are generated through operating keys other than the direction keys of the mobile terminal.

* * * * *